(12) United States Patent
Fujii et al.

(10) Patent No.: US 7,133,276 B2
(45) Date of Patent: Nov. 7, 2006

(54) SOLID ELECTROLYTIC CAPACITOR

(75) Inventors: Eizo Fujii, Osaka (JP); Hidenori Kamigawa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/244,167

(22) Filed: Oct. 6, 2005

(65) Prior Publication Data

US 2006/0077618 A1  Apr. 13, 2006

(30) Foreign Application Priority Data

Oct. 8, 2004  (JP) .............................. 2004-295881

(51) Int. Cl.
*H01G 9/00* (2006.01)

(52) U.S. Cl. ............ 361/523; 361/525; 361/528; 361/529; 361/532; 361/516; 29/25.03

(58) Field of Classification Search ........ 361/523–525, 361/528–529, 531–535, 516–519; 29/25.03
See application file for complete search history.

(56) References Cited

U.S. PATENT DOCUMENTS 6,238,444 B1 *  5/2001  Cadwallader .............. 29/25.03

| 6,625,009 | B1 * | 9/2003 | Maeda ..................... 361/528 |
| 6,882,520 | B1 * | 4/2005 | Kamigawa et al. ......... 361/528 |
| 6,920,037 | B1 * | 7/2005 | Sano et al. ................ 361/540 |
| 7,031,141 | B1 * | 4/2006 | Kuriyama ................. 361/540 |
| 7,038,905 | B1 * | 5/2006 | Yoshihara et al. ......... 361/540 |
| 2005/0286210 | A1 * | 12/2005 | Ishida et al. .............. 361/516 |

FOREIGN PATENT DOCUMENTS

JP  10-64761  3/1998
JP  2001-244145  9/2001

* cited by examiner

*Primary Examiner*—Nguyen T. Ha
(74) *Attorney, Agent, or Firm*—Westerman, Hattori, Daniels & Adrian, LLP.

(57) ABSTRACT

A solid electrolytic capacitor of the present invention includes a capacitor element with an anode element and a cathode layer, having an anode lead member planted on one end surface of the anode element, an anode terminal connected to the anode lead member, a platy cathode terminal placed on a reverse surface of the capacitor element and connected to the cathode layer, and an enclosure resin part enclosing the capacitor element, a part of the cathode terminal and a part of the anode terminal being exposed from a bottom surface of the enclosure resin part. At least the cathode terminal has formed thereon a plurality of projections projecting in a position apart from a reverse surface of the enclosure resin part in a direction along the reverse surface.

6 Claims, 6 Drawing Sheets

A-A SECTION

SOLID ELECTROLYTIC CAPACITOR

The priority application Number 2004-295881 upon which this patent application is based is hereby incorporated by reference.

BACKGROUND OF THE INVENTION

1. Field of the Invention

The present invention relates to a solid electrolytic capacitor, and particularly, to an improvement in a terminal structure of a solid electrolytic capacitor capable of being surface-mounted on a circuit board.

2. Description of Related Art

Figure 11:
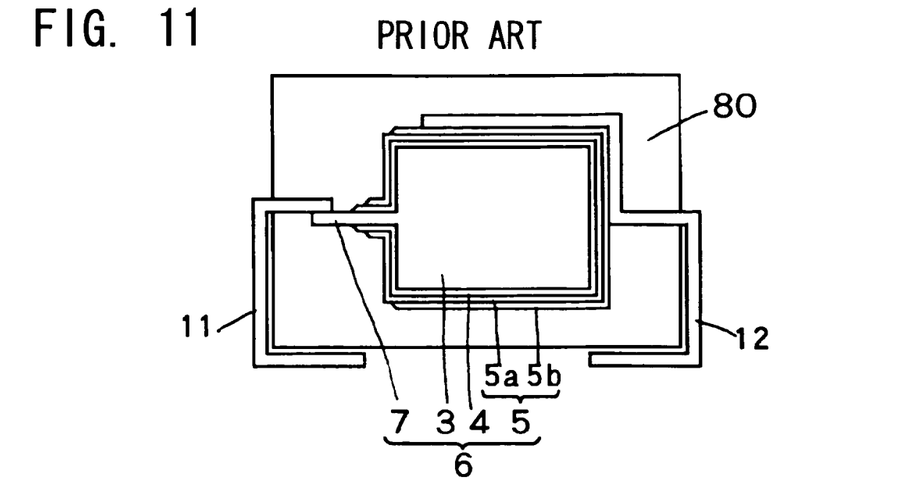
FIG. 11 is a vertical sectional view of a conventional solid electrolytic capacitor.

A solid electrolytic capacitor having a structure shown in FIG. 11 has been conventionally known. A capacitor element 6 included in the solid electrolytic capacitor includes an anode element 3 made of a sintered body of a valve-action metal (tantalum, niobium, titanium, aluminum, etc.), a dielectric coating 4 made by oxidizing a surface layer of the anode element, and a cathode layer 5 having sequentially formed therein a solid electrolyte layer 5a made of a conductive inorganic material such as manganese dioxide or a conductive organic material such as TCNQ complex salt, a conductive polymer, etc. and a cathode lead layer 5b made of carbon, silver, etc. An anode lead frame 11 is connected to an anode lead member 7 planted on one end surface of the anode element 3, while a cathode lead frame 12 is connected to the cathode layer 5. A periphery of the capacitor element 6 is coated and sealed by an enclosure resin part 80 made of epoxy resin or the like. The anode lead frame 11 and the cathode lead frame 12 are bent along a surface of the enclosure resin part 80 (see JP 10-64761 A).

However, there has been a problem that the capacitor element 6 cannot be sufficiently large in overall size relative to a solid electrolytic capacitor finished product because the solid electrolytic capacitor of the above-described structure needs to have an entire periphery of the capacitor element 6 coated with an enclosure resin.

Figure 12:
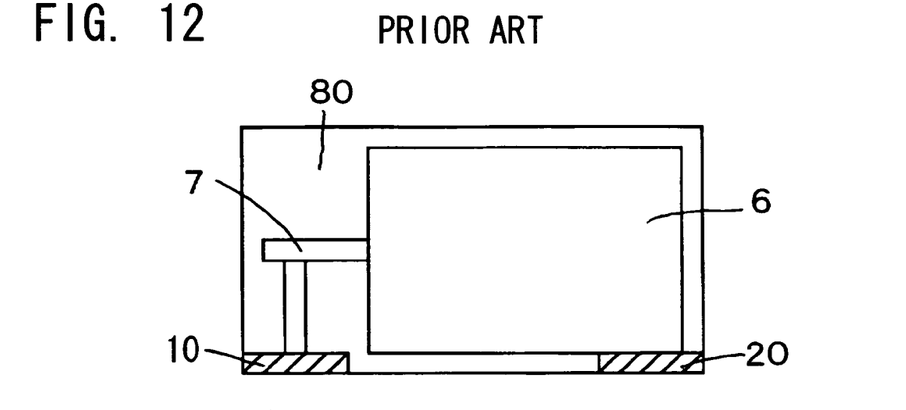
FIG. 12 is a vertical sectional view of another conventional solid electrolytic capacitor.

Accordingly, the present inventors have proposed a technique of incorporating a capacitor element 6 with a larger occupying volume relative to an overall size of a solid electrolytic capacitor finished product by mounting the capacitor element 6 on a platy anode terminal 10 and cathode terminal 20 as shown in FIG. 12 to make a gap as small as possible between an outer peripheral surface of the capacitor element 6 and an outer peripheral surface of an enclosure resin part 80 (JP 2001-244145 A).

Figure 13:
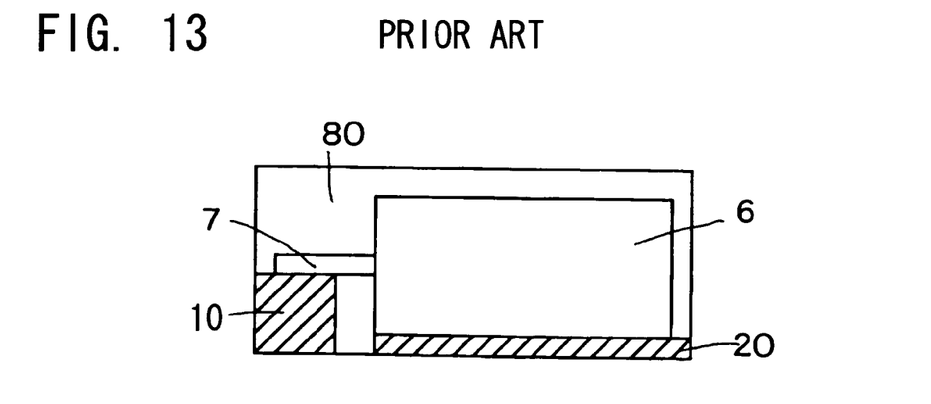
FIG. 13 is a vertical sectional view of a solid electrolytic capacitor proposed by the applicants.

In the solid electrolytic capacitor, an ESR (Equivalent Series Resistance) and an ESL (Equivalent Series Inductance) in the solid electrolytic capacitor finished product can be reduced because it is unnecessary to provide a lead frame bent along a surface of the enclosure resin part as conventionally, so that a current path from the capacitor element 6 to a circuit board can be shortened. Furthermore, a distance between current paths of an anode and a cathode to the circuit board can be shortened by extending the cathode terminal 20 of the solid electrolytic capacitor to the vicinity of the anode terminal 10 as shown in FIG. 13. An ESL in a high-frequency area can be thereby further reduced.

However, there has been a problem in the solid electrolytic capacitor shown in FIG. 12 and FIG. 13 that if a great external force acts on the anode terminal 10 and the cathode terminal 20 during manufacture or after completion, the anode terminal 10 and the cathode terminal 20 are likely to peel off from the enclosure resin part 80, and especially the cathode terminal 20 peels off easily.

There has been also a problem in the solid electrolytic capacitor shown in FIG. 12 and FIG. 13 that if moisture infiltrates from a bottom surface side of the enclosure resin part 80 into an interface between both the terminals 10, 20 and the enclosure resin part 80, because a distance from the bottom surface of the enclosure resin part 80 to the capacitor element 6 is short, the moisture easily reaches to the capacitor element 6 through a short path to thereby degrade characteristics of the capacitor element 6.

SUMMARY OF THE INVENTION

An object of the present invention is to provide a solid electrolytic capacitor of a structure that prevents an anode terminal and a cathode terminal from easily peeling off due to action of an external force and prevents moisture from infiltrating, as well as obtains a reduction effect for an ESR and an ESL.

A solid electrolytic capacitor of the present invention comprises a capacitor element 6 with an anode part and a cathode part, an anode terminal 1 connected to the anode part of the capacitor element 6, a platy cathode terminal 2 placed on a reverse surface of the capacitor element 6 and connected to the cathode part, and an enclosure resin part 8 enclosing the capacitor element 6, the anode terminal 1 and the cathode terminal 2, a part of the cathode terminal 2 and a part of the anode terminal 1 being exposed from a bottom surface of the enclosure resin part 8. At least the cathode terminal 2 has formed thereon at least one projection projecting in a position apart from a reverse surface of the enclosure resin part 8 in a direction along the reverse surface, the projection being embedded in the enclosure resin part. The projection may be parallel to or inclined against the reverse surface.

According to the above-described solid electrolytic capacitor of the present invention, even if a great external force acts on the cathode terminal 2, because the projection formed on the cathode terminal 2 is embedded in the enclosure resin part 8, the external force is reliably received by the projection. Therefore, the cathode terminal 2 is unlikely to peel off from the enclosure resin part 8. If the same projection is formed not only on the cathode terminal 2 but also on the anode terminal 1, the same peeling-off prevention effect as in the cathode terminal 2 is obtained also in the anode terminal 1. The peeling-off prevention effect can of course be increased by increasing the number of projections.

Furthermore, moisture infiltrated from the bottom surface of the enclosure resin part 8 into an interface between the both terminals 1, 2 and the enclosure resin part 8 needs to change a traveling direction a plurality of times in the projection-forming part when passing through the projection. This increases a distance before reaching to the capacitor element 6, and therefore the infiltration can be prevented on the way thereto.

In a specific construction, the cathode terminal 2 has on a reverse surface thereof at least two exposed surfaces exposed from the reverse surface of the enclosure resin part 8. According to the solid electrolytic capacitor having the specific construction, a difference between an area of each exposed surface and an area of the exposed surfaces of the cathode terminal 2 can be smaller by forming at least two exposed surfaces on the reverse surface of the cathode terminal 2, which is larger in planar shape than the anode terminal 1. In a process of surface-mounting the solid electrolytic capacitor on a circuit board, molten solder on the circuit board is thereby to be dispersed in each of the exposed surfaces without great deviation, so that the solid electrolytic capacitor on the solder is unlikely to move with shrinkage due to surface tension of the solder.

Furthermore, in a specific construction, one exposed surface of the two exposed surfaces of the cathode terminal 2 is formed in a closer position to an exposed surface of the anode terminal 1 than the other exposed surface is. An ESL in a high-frequency area can be thereby further reduced.

As described above, according to the solid electrolytic capacitor of the present invention, the anode terminal and the cathode terminal are prevented from easily peeling off due to action of an external force, and infiltration of moisture is suppressed, while a reduction effect for an ESR and an ESL is obtained.

DETAILED DESCRIPTION OF THE INVENTION

Figure 6:
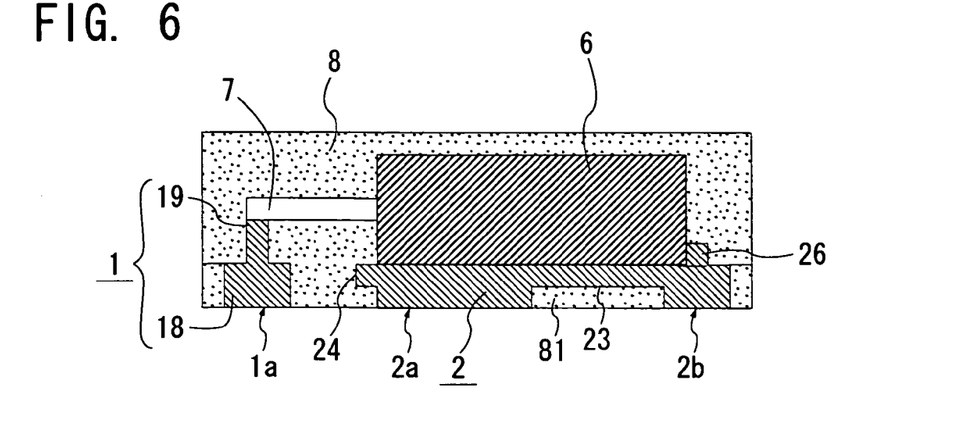
FIG. 6 is a vertical sectional view of a solid electrolytic capacitor of the present invention.

An embodiment of the present invention will be specifically described below with reference to the drawings. A solid electrolytic capacitor of the present invention includes, as shown in FIG. 6, a capacitor element 6 having an anode lead member 7 planted thereon, an anode terminal 1 connected to the anode lead member 7, a platy cathode terminal 2 placed on a reverse surface of the capacitor element 6, and an enclosure resin part 8 enclosing the capacitor element 6, the anode terminal 1 and the cathode terminal 2. Like the conventional solid electrolytic capacitor shown in FIG. 11, the capacitor element 6 has a dielectric coating 4 and a cathode layer 5 formed on a surface of an anode element 3. The anode lead member 7 is planted on one end surface of the anode element 3. In the present embodiment, the anode lead member acts as an anode part, and a cathode layer forming part of the capacitor element acts as a cathode part.

A periphery of the capacitor element 6, the anode terminal 1 and the cathode terminal 2 is coated and sealed by the enclosure resin part 8 made of epoxy resin or the like. An exposed surface 1a of the anode terminal 1 and two exposed surfaces 2a, 2b of the cathode terminal 2 are exposed on a reverse surface of the enclosure resin part 8. The anode terminal 1 and the cathode terminal 2 are fabricated by pressing a board material made of an alloy mainly containing copper. In a description of a positional relationship given below, a projecting direction of the anode lead member 7 is defined as a front, and a direction orthogonal thereto is defined as a side.

Figure 7:
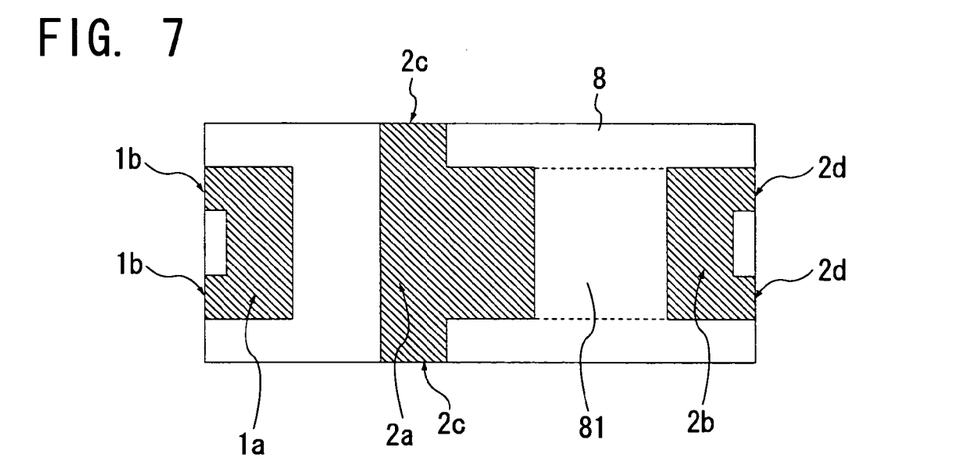
FIG. 7 is a reverse view of the solid electrolytic capacitor.
Figure 8:
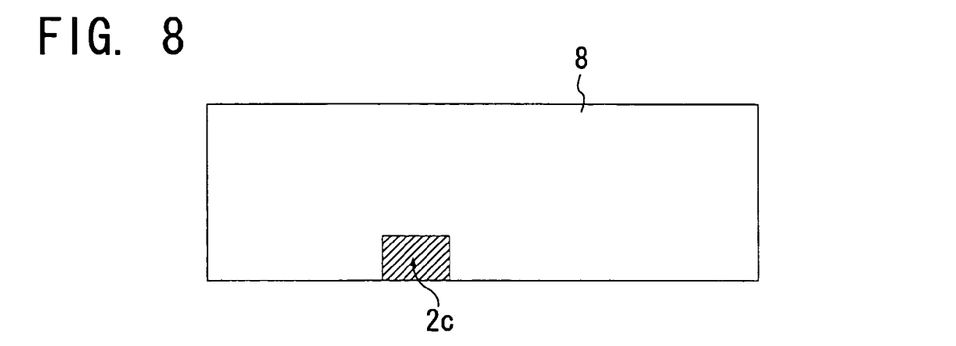
FIG. 8 is a side view of the solid electrolytic capacitor.

As shown in FIG. 7, the exposed surface 1a of the anode terminal 1 and the rear exposed surface 2b of the cathode terminal 2 each have the same outline shape. The front exposed surface 2a of the cathode terminal 2 is positioned approximately in the middle of both the exposed surfaces 1a, 2b. The cathode terminal 2 also has, in both sides thereof as shown in FIG. 8, exposed surfaces 2c, 2c exposed from side surfaces of the enclosure resin part 8.

Figure 9:
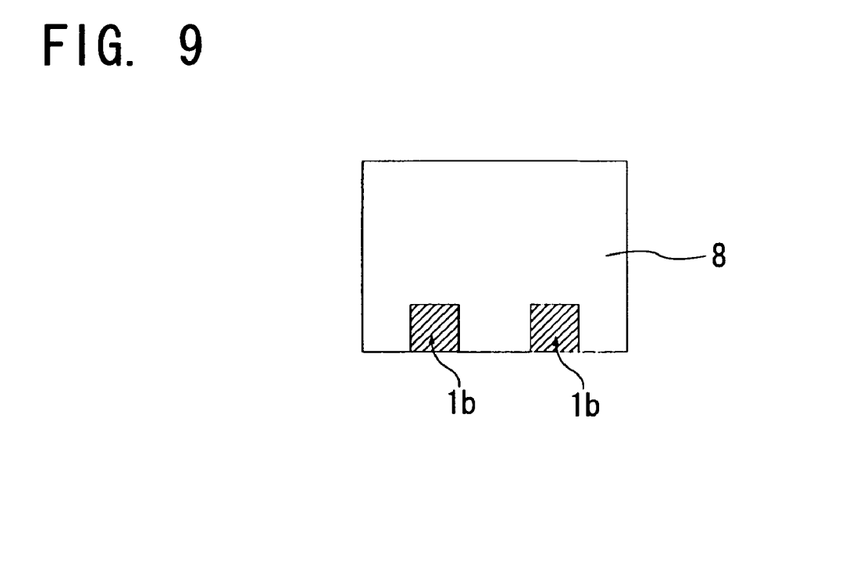
FIG. 9 is a front view of the solid electrolytic capacitor.

Furthermore, as shown in FIG. 7 and FIG. 9, the anode terminal 1 has two exposed surfaces 1b, 1b exposed on a front end surface of the enclosure resin part 8. Similarly, the cathode terminal 2 has also two exposed surfaces 2d, 2d exposed on a rear end surface of the enclosure resin part 8.

As shown in FIG. 1 and FIG. 3 to FIG. 5, the anode terminal 1 has a prismatic protruding line portion 19 formed on a platy base portion 18. A recessed portion 13 is formed in the middle of a front end surface of the base portion 18. Furthermore, the protruding line portion 19 has formed on both ends thereof a pair of projections 15, 15 slightly projecting from either side surface of the base portion 18.

The cathode terminal 2 includes a platy base portion 21 having a smaller width than a width of the enclosure resin part 8. The base portion 21 has formed on an end thereof on the anode terminal 1 side a pair of right and left arm portions 22, 22 projecting from either side surface thereof toward either side surface of the enclosure resin part 8. An end surface of each of the arm portions 22 forms an exposed surface 2c shown in FIG. 8. A recessed portion 27 is formed in the middle of a rear end surface of the cathode terminal 2.

Furthermore, the cathode terminal 2 has formed on a reverse surface thereof a recessed portion 23 extending across both side surfaces of the cathode terminal 2, which forms the above-described two exposed surfaces 2a, 2b shown in FIG. 7 on the reverse surface of the cathode terminal 2. As shown in FIG. 6, the recessed portion 23 of the cathode terminal 2 is provided with a resin charged portion 81 made by charging a part of the resin of the enclosure resin part 8. The resin charged portion 81 connects to the other part of the enclosure resin part 8.

As shown in FIG. 1 and FIG. 3 to FIG. 5, the cathode terminal 2 is provided with a band plate-like first projection 24 projecting forward from a front end surface of the base portion 21 in a higher position than that of the exposed surfaces 2a, 2b of the cathode terminal 2. Both side surfaces of the base portion 21 are also provided with a pair of right and left second projections 25, 25 projecting toward either side in a slightly rear position of the arm portions 22, 22 in a higher position than that of the exposed surfaces 2a, 2b of the cathode terminal 2. Furthermore, both side surfaces of the base portion 21 are provided with a pair of right and left third projections 26, 26 projecting toward either side and upward in a position adjacent to a rear end surface thereof in a higher position than that of the exposed surfaces 2a, 2b of the cathode terminal 2.

Therefore, all of the above-described projections 15 of the anode terminal 1 and first to third projections 24, 25, 26 of the cathode terminal 2 are, as shown in FIG. 6, to be embedded in the enclosure resin part 8, projecting in a position apart from a reverse surface of the enclosure resin part 8 in a direction along the reverse surface.

Figure 10:
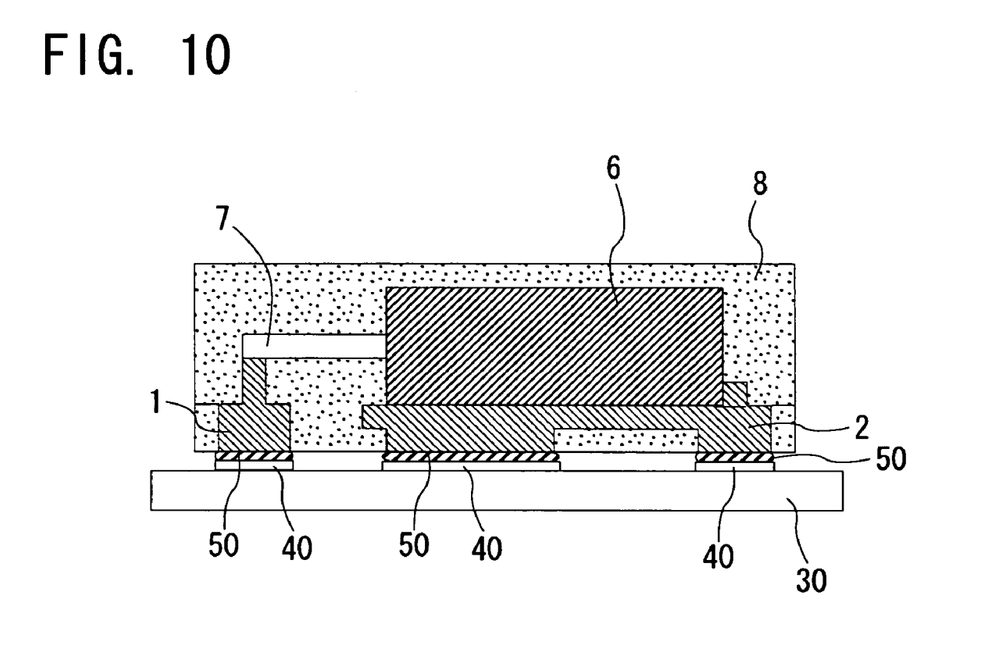
FIG. 10 is a vertical sectional view showing a process of surface-mounting the solid electrolytic capacitor on a circuit board.

In a process of surface-mounting the above-described solid electrolytic capacitor of the present invention on a circuit board, as shown in FIG. 10, cream solder 50 is pasted covering a land 40 on a circuit board 30, and the solid electrolytic capacitor is mounted thereon. Then, the solid electrolytic capacitor is soldered to the circuit board 30 by reflow process.

Figure 14:
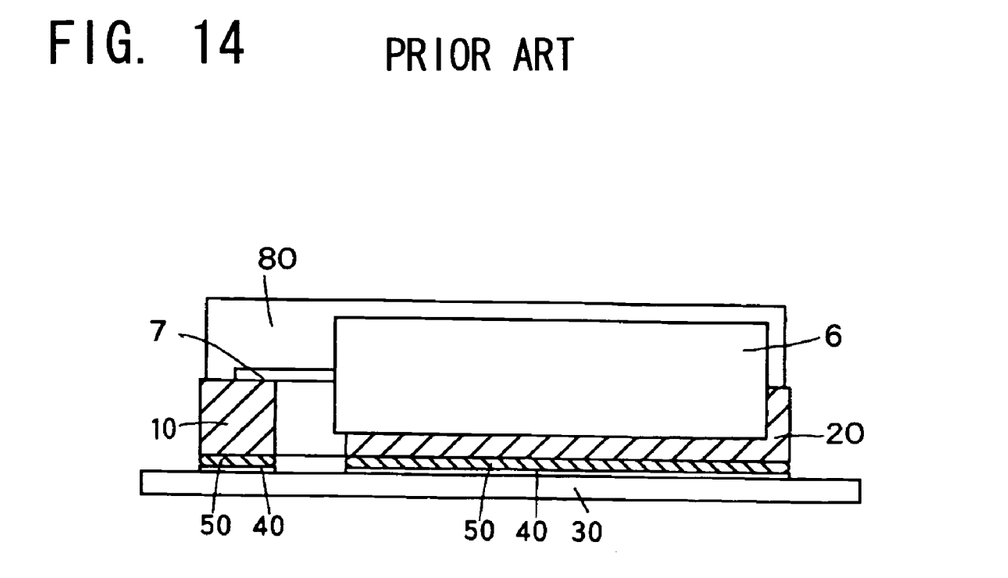
FIG. 14 is a vertical sectional view showing a process of surface-mounting the solid electrolytic capacitor on a circuit board.
Figure 15:
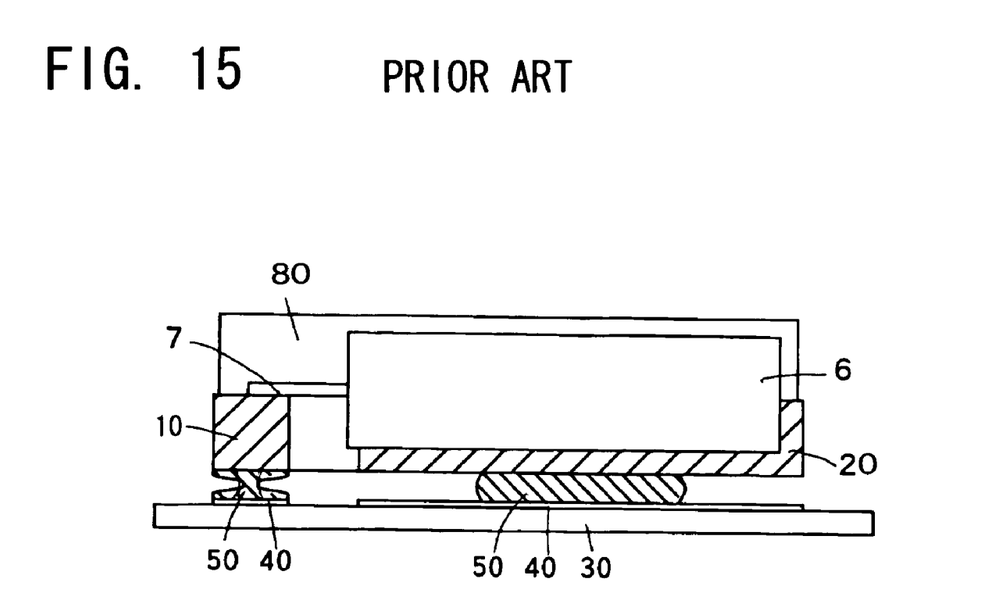
FIG. 15 is a vertical sectional view showing the solid electrolytic capacitor surface-mounted on the circuit board.

In the solid electrolytic capacitor shown in FIG. 13, a difference in area between an exposed surface of the anode terminal 10 and an exposed surface of the cathode terminal 20 exposed from the enclosure resin part 80 is greater than a difference in area in the solid electrolytic capacitor shown in FIG. 12. Therefore, as shown in FIG. 14 and FIG. 15, solder 50 on a land 40 with a larger area corresponding to the exposed surface of the cathode terminal 20 shrinks due to surface tension when melting. The solid electrolytic capacitor on the solder 50 is thereby pushed up, which can cause displacement, resulting in disconnection in the anode terminal.

In contrast, in the solid electrolytic capacitor of the present invention, as shown in FIG. 7, the two exposed surfaces 2a, 2b are formed on the reverse surface of the cathode terminal 2 with the resin charged portion 81 held therebetween. Therefore, a difference in area between the exposed surface 1a of the anode terminal 1 and each of the exposed surfaces 2a, 2b of the cathode terminal 2 can be smaller. In the process of surface-mounting the solid electrolytic capacitor on the circuit board, the molten solder on the circuit board is thereby to be approximately uniformly dispersed on each of the exposed surfaces. Therefore, the solid electrolytic capacitor on the solder is unlikely to move with shrinkage due to surface tension of the solder. Moreover, fixing strength to the circuit board improves because the solid electrolytic capacitor is supported at three points in good balance by the exposed surface 1a of the anode terminal 1 and the two exposed surfaces 2a, 2b of the cathode terminal 2.

In the solid electrolytic capacitor of the present invention, the anode terminal 1 has formed thereon the pair of projections 15, 15 projecting toward either side, while the cathode terminal 2 has the first projection 24 projecting forward and the pair of arm portions 22, 22 projecting toward either side formed on a front portion thereof corresponding to one exposed surface 2a, and the pair of third projections 26, 26 projecting toward either side formed on a rear portion thereof corresponding to the other exposed surface 2b, these plurality of projections being embedded in the enclosure resin part 8. Therefore, even if a great external force acts on the anode terminal 1 and the cathode terminal 2 during a manufacturing process or after completion, the external force is reliably received by the plurality of projections. Thus, the anode terminal 1 and the cathode terminal 2 are unlikely to peel off from the enclosure resin part 8.

Furthermore, moisture infiltrated from the bottom surface of the enclosure resin part 8 into an interface between both the terminals 1, 2 and the enclosure resin part 8 needs to change a traveling direction a plurality of times in the projection-forming part when passing through the projection. This increases a distance before reaching to the capacitor element 6, and therefore the infiltration can be prevented on the way thereto.

Furthermore, an ESR and an ESL can be reduced in the solid electrolytic capacitor of the present invention because a current path from the capacitor element 6 to the circuit board is short as shown in FIG. 6. In particular, an ESL in a high-frequency area can be further reduced because the cathode terminal 2 extends from a rear end of the capacitor element 6 to a base end of the anode lead member 7, and reaches to a near position of the anode terminal 1.

Furthermore, the cathode terminal 2 has the pair of right and left arm portions 22, 22 projected therefrom, and an end surface of each of the arm portions 22 is exposed on a side surface of the enclosure resin part 8. Therefore, it can be checked whether the soldering is good or not at a glance after completion of soldering.

Figure 1:
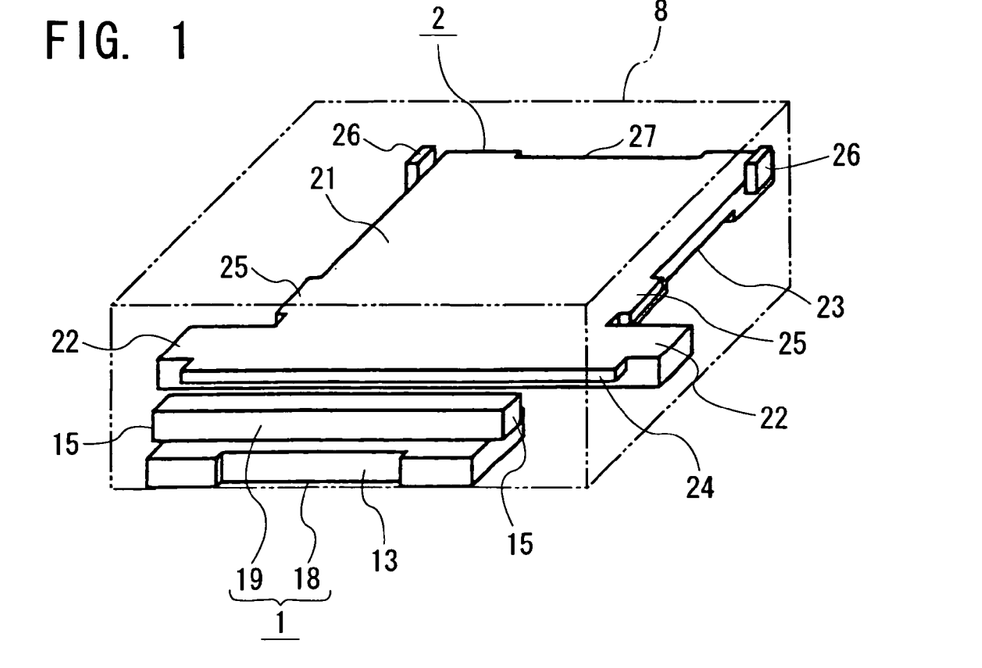
FIG. 1 is a perspective view showing a shape of an anode terminal and a cathode terminal of a solid electrolytic capacitor of the present invention.
Figure 2:
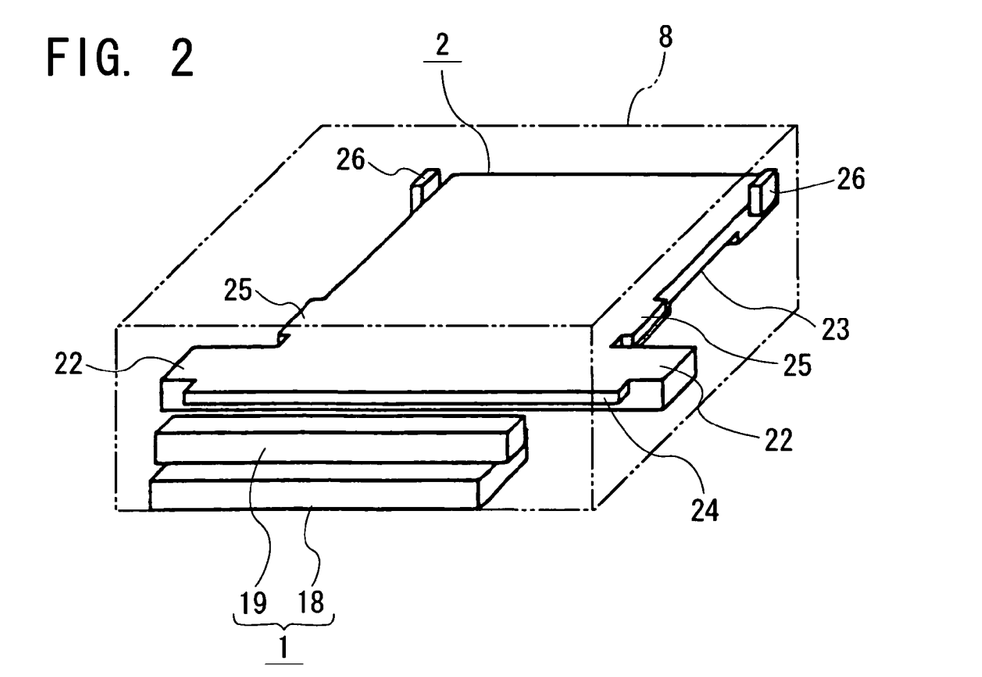
FIG. 2 is a perspective view showing the same in another embodiment.
Figure 3:
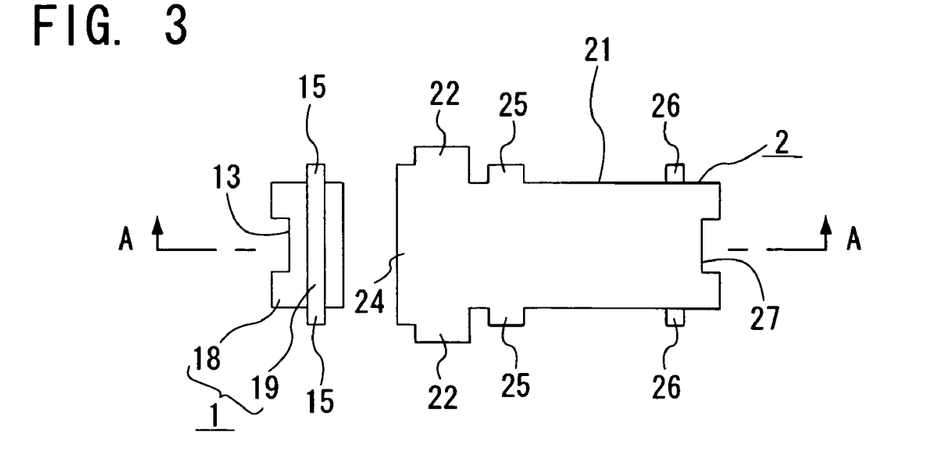
FIG. 3 is a plan view of the anode terminal and the cathode terminal.
Figure 4:
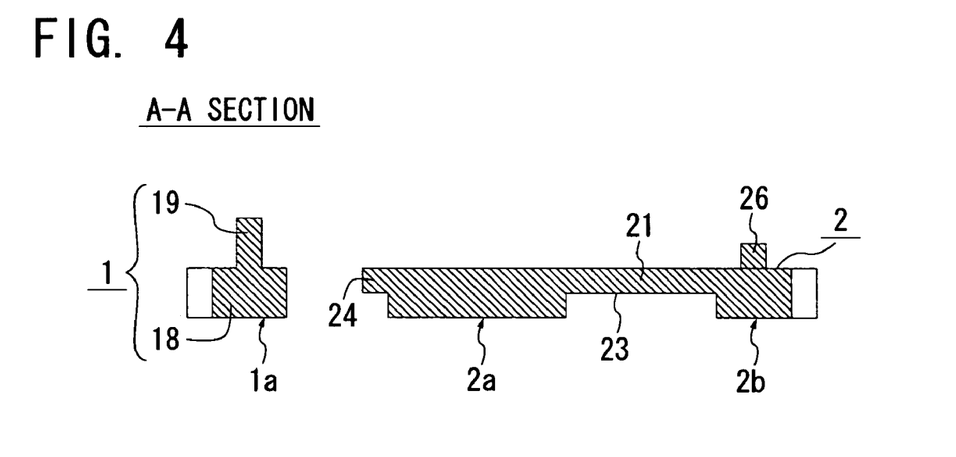
FIG. 4 is a vertical sectional view along A—A line in FIG. 3.
Figure 5:
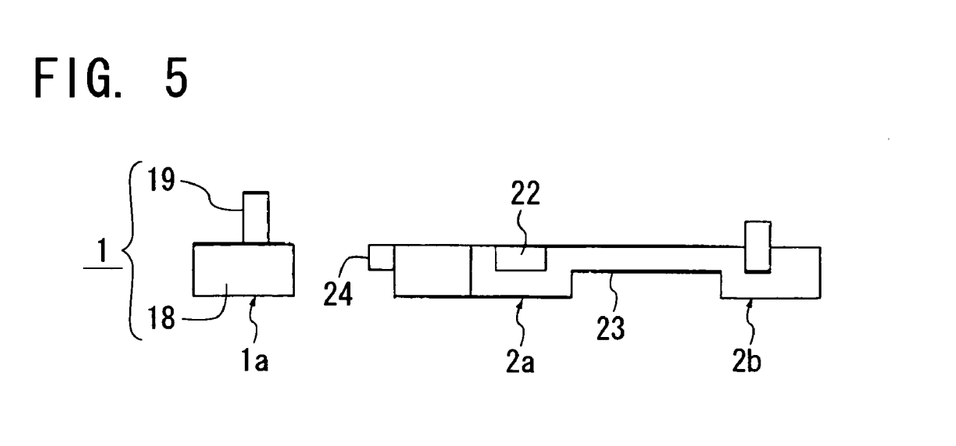
FIG. 5 is a side view of the anode terminal and the cathode terminal.

The present invention is not limited to the foregoing embodiment but can be modified variously by one skilled in the art without departing from the spirit of the invention as set forth in the appended claims. For example, as shown in FIG. 2, a front end surface of the anode terminal 1 and a rear end surface of the cathode terminal 2 may each be flat with the whole surface thereof being exposed from the enclosure resin part 8. In the present embodiment, a sintered tantalum was used as a material of the anode element, but the material is not particularly limited if a valve-action metal is used. Use of a sintered body or foil of niobium, titanium, aluminum, etc. can also lead to the same effect.

What is claimed is:

1. A solid electrolytic capacitor comprising a capacitor element with an anode part and a cathode part, an anode terminal connected to the anode part of the capacitor element, a platy cathode terminal placed on a reverse surface of the capacitor element and connected to the cathode part, and an enclosure resin part enclosing the capacitor element, the anode terminal and the cathode terminal, and an exposure surface where a part of the cathode terminal and a part of the anode terminal being exposed from a bottom surface of the enclosure resin part, at least the cathode terminal having formed thereon at least one projection extending from a position that corresponds to the exposure surface of the enclosure resin part and projecting outward of the capacitor element in a position apart from a reverse surface of the enclosure resin part 8 in a direction along the reverse surface, the projection being embedded in the enclosure resin part.

2. The solid electrolytic capacitor according to claim 1, wherein the anode terminal and the cathode terminal each have formed thereon at least one projection extending from a position that corresponds to the exposure surface in a direction along the reverse surface of the enclosure resin part and projecting outward of the capacitor element in position apart from the reverse surface of the enclosure resin part in a direction along the reverse surface.

3. A solid electrolytic capacitor comprising a capacitor element with an anode part and a cathode part, an anode terminal connected to the anode part of the capacitor element, a platy cathode terminal placed on a reverse surface of the capacitor element and connected to the cathode part, and an enclosure resin part enclosing the capacitor element, the anode terminal and the cathode terminal, a part of the cathode terminal and a part of the anode terminal being exposed from a bottom surface of the enclosure resin part, at least the cathode terminal having formed thereon at least one projection projecting in a position apart from a reverse surface of the enclosure resin part in a direction along the reverse surface, the projection being embedded in the enclosure resin part, wherein the cathode terminal has on a reverse surface thereof at least two exposed surfaces exposed from the reverse surface of the enclosure resin part.

4. The solid electrolytic capacitor according to claim 3, wherein one exposed surface of the two exposed surfaces of the cathode terminal is formed in a closer position to an exposed surface of the anode terminal than the other exposed surface is.

5. The solid electrolytic capacitor according to claim 3, wherein the projection is formed on the cathode terminal in two locations corresponding to each of the two exposed surfaces.

6. The solid electrolytic capacitor according to claim 5, wherein one of the two locations is a front surface of the cathode terminal opposed to the anode terminal, and the other location is a side surface orthogonal to the front surface.

* * * * *